United States Patent
Lee

(10) Patent No.: US 9,056,524 B2
(45) Date of Patent: *Jun. 16, 2015

(54) CASTER WHEEL WITH PARABOLIC TREAD-HUB INTERFACE

(71) Applicant: Caster Concepts, Inc., Albion, MI (US)

(72) Inventor: Elmer Lee, Albion, MI (US)

(73) Assignee: Caster Concepts, Inc., Albion, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/470,101

(22) Filed: Aug. 27, 2014

(65) Prior Publication Data

US 2014/0359970 A1    Dec. 11, 2014

Related U.S. Application Data

(63) Continuation of application No. 14/103,126, filed on Dec. 11, 2013, now Pat. No. 8,863,355.

(60) Provisional application No. 61/735,559, filed on Dec. 11, 2012.

(51) Int. Cl.

| B60B 33/00 | (2006.01) |
| --- | --- |
| B60B 27/00 | (2006.01) |
| B60B 27/02 | (2006.01) |
| B60B 3/00 | (2006.01) |

(52) U.S. Cl.
CPC ......... *B60B 33/0047* (2013.01); *B60B 33/0042* (2013.01); *B60B 33/0039* (2013.01); *Y10T 16/1853* (2015.01); *Y10T 16/1847* (2015.01); *B60B 3/001* (2013.01); *B60B 27/0005* (2013.01); *B60B 27/02* (2013.01);
(Continued)

(58) Field of Classification Search
CPC ... Y10T 16/18; Y10T 16/184; Y10T 16/1847; Y10T 16/1853; Y10T 16/1857; B60B 33/0042; B60B 33/0047; B60B 33/0049; B60B 33/0028; B60B 2900/311; B60B 2900/711; B60B 27/0005; B60B 27/001; B60B 27/02; B60B 3/001; B65D 90/18; B60C 7/24; F16C 13/006
USPC .............................................. 16/18 R, 45–48
See application file for complete search history.

(56) References Cited

U.S. PATENT DOCUMENTS

| 1,160,121 A | 11/1915 | Allen |
| --- | --- | --- |
| 1,634,558 A | 7/1927 | Roe |
| 2,267,403 A | 12/1941 | Herold |

(Continued)

FOREIGN PATENT DOCUMENTS

| DE | 2937571 A | 4/1981 |
| --- | --- | --- |
| EP | 0255592 A | 2/1988 |

*Primary Examiner* — William Miller
(74) *Attorney, Agent, or Firm* — Endurance Law Group, PLC

(57) ABSTRACT

A caster wheel assembly includes at least one hub that has an annularly dished concave region disposed between a pair of cylindrical lips about its outer periphery. An elastomeric tread has a convex inner periphery that seats in the concave region of the hub. The interface between the hub and tread is parabolic in cross-section to manage load-inducted stresses in the tread. The parabolic cross-section is defined by the equation $y=A*x^2$, where A is between 1.5 and 4. A cylindrical lip/pad interface is established between hub and tread on opposite sides of the parabolic interface to accommodate high load situations. A bearing is supported in the hub, and a bushing inside the bearing. An axle shaft passing through the bushing attaches the hub and tread to a support bracket for use in a wide variety of industrial applications.

15 Claims, 6 Drawing Sheets

(52) U.S. Cl.
CPC ...... *B60B 33/0028* (2013.01); *B60B 2900/311* (2013.01); *B60B 2900/711* (2013.01)

(56) References Cited

U.S. PATENT DOCUMENTS

| | | | |
|---|---|---|---|
| 2,854,052 A | 9/1958 | Smith et al. | |
| 3,114,408 A | 12/1963 | Ross | |
| 4,054,335 A | 10/1977 | Timmer | |
| 4,127,166 A | 11/1978 | Wyman | |
| 4,387,070 A | 6/1983 | Cunard et al. | |
| 4,783,880 A | 11/1988 | Chapman et al. | |
| 4,944,563 A | 7/1990 | Pinchbeck et al. | |
| 5,117,885 A | 6/1992 | Crawford | |
| 5,211,213 A | 5/1993 | Hicks | |
| 5,406,675 A | 4/1995 | White | |
| 6,482,140 B1 | 11/2002 | Takatsu | |
| 6,880,203 B1 | 4/2005 | Aubin | |

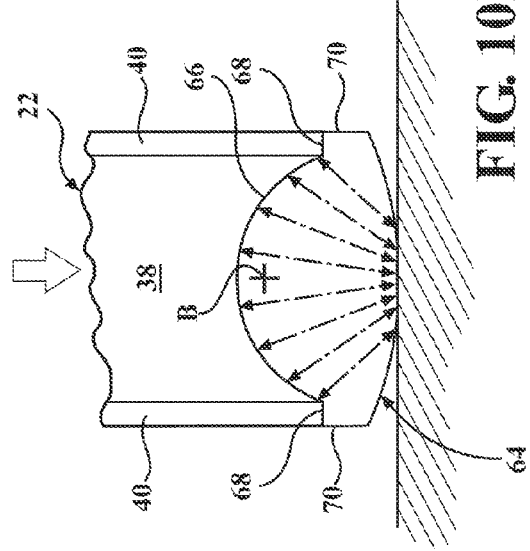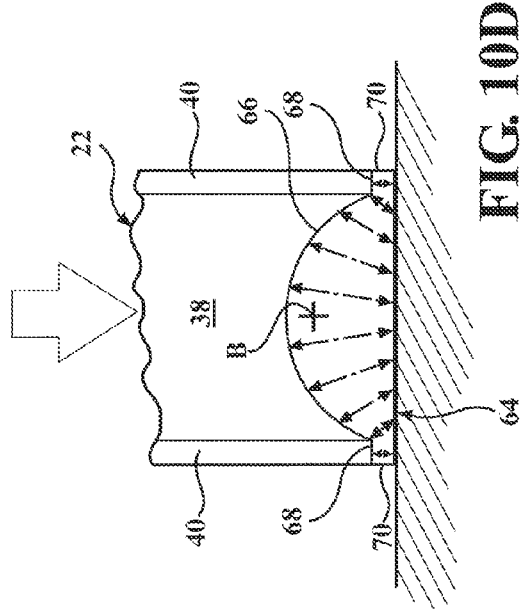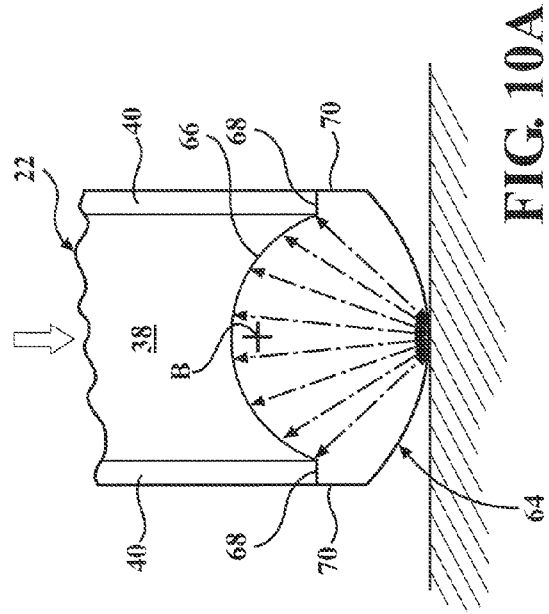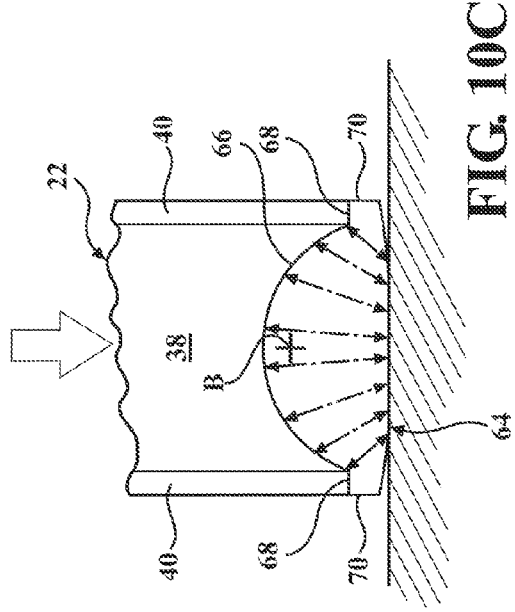

CASTER WHEEL WITH PARABOLIC TREAD-HUB INTERFACE

CROSS REFERENCE TO RELATED APPLICATIONS

This application is a continuation of U.S. patent application Ser. No. 14/103,126, filed Dec. 11, 2013, which claims priority to Provisional Patent Application No. 61/735,559 filed Dec. 11, 2012, the entire disclosures of which are hereby incorporated by reference and relied upon.

BACKGROUND OF THE INVENTION

1. Field of the Invention

The invention relates generally to casters having one or more wheels of specific construction, and more particularly to a caster wheel having a resilient tread with engineered rim or hub interface to more effectively accommodate a wide range of loading stresses.

2. Description of Related Art

A caster wheel is single, double, or compound wheel that is designed to be mounted to the bottom of a larger object, or vehicle, so as to enable that object to be easily moved. The term "caster wheel" as used herein is intended to apply to both driven and un-driven configurations, although un-driven or free-wheeling configurations are more common. High capacity, heavy duty casters are used in many industrial applications, such as platform trucks, carts, assemblies, and tow lines in plants.

A standard caster wheel has a center rotating hub (with or without a bushing or bearing) and a compliant tread material applied about its outer periphery as a rolling contact surface. The outer diameter of a caster wheel affects how easy it is for the caster to be able to move across rough or irregular surfaces. Large diameter caster wheels are able to bridge wide gaps, such as between an elevator door and an elevator car. In situations where heavy loads need to be transported on casters, load capacity may be increased by using wider wheels with more ground contact area. However, when rotating in-place a wide swivel caster, the center part of the wheel-to-ground contact patch rotates slower than the regions further out to the sides. This difference in rotation speed across the base of the wheel contact patch causes wide wheels to resist rotation around the point of swivel, a resistance which increases as weight loading increases.

An alternate way to increase load capacity while limiting swivel-rotation resistance is to use multiple narrow wheels in tandem on the same wheel axis, as shown for example in FIG. 1. Each wheel of a dual-wheel swiveling caster has a comparatively narrower ground contact patch (i.e., footprint) than a single wide wheel and each wheel is able to rotate independently at a different rate, so there is less resistance to turning in place on the swivel. There are several scenarios that dictate the use of a dual-wheel caster in an industrial application.

A first one of these scenarios is when the anticipated load cannot easily be carried by one wheel. When the anticipated load to be transported exceeds the load rating of one wheel then a dual-wheel configuration can be an excellent solution. A second scenario occurs when there is a need to reduce the height of the cart or platform. One way to reduce the height of a cart or platform that is fitted for casters is to spread the load over more wheels. When the load is spread over twice (2x) the number of wheels, the diameter of the wheel can be reduced as the calculated load on each wheel is halved. The use of a dual-wheel caster will generally reduce the overall height by approximately 30% while carrying the same load. Thirdly, dual-wheel casters are necessary when there is the need to reduce per square inch of floor loading. Commonly in applications where there is restriction on per square inch loading of floors (due to structural concerns or surface concerns) the load can be proportionally spread across a greater wheel surface. Still further, dual-wheel casters enable easier swiveling when a cart is fully loaded. Generally stated, the heavier the load is on each wheel (greater load per square inch) the more force it will take to swivel a caster assembly. The use of dual-wheels halves the per-wheel load and thus can allow assembly swiveling to take place with less force. As a dual-wheel caster assembly swivels, one wheel will often turn clockwise while the other wheel rotates counter clockwise. In effect, the vertical swivel axis is located between the two wheels, thereby reducing wheel scrubbing and making the swiveling of heavy loads simpler.

Certain uses may require a caster wheel to have a resilient tread material around the outer perimeter of the wheel. The tread can be made of many elastomeric materials and take on different shapes, such as a pneumatic tire, a coating of polyurethane or over-molded elastomer. The hardness of a caster wheel tread affects ease of rolling, traction, durability, shock absorption, and noise. Hard wheels are easier to roll on smooth surfaces, but are noisier and provide less traction. Soft wheels are easier to push on rough surfaces, quieter, protect the floor, absorb shock and provide better traction, but have a lower load capacity. This presents a problem in situations where a heavy load needs to be transported with the positive effects of soft wheels, for example, good traction, shock absorption and floor protection. If an elastomeric tread is omitted altogether to increase load capacity, then the positive aspects of the tread are also removed.

The radial thickness of the tread will affect the rolling characteristics of a caster wheel. All things being equal, thin treads are easier to push while thick treads have better shock absorption. Again, in industrial situations where ease of transportation by pushing combined with good shock absorption is key, the design engineer is frequently left with a compromise or trade-off between low rolling resistance and good shock absorption.

Furthermore, the working life of an elastomeric tread tends to define the working life of a caster wheel assembly. That is, the tread tends to be the primary wear part of a caster wheel assembly. When the tread life is near its end, the entire caster assembly is typically replaced or at least the worn wheel is replaced. One factor contributing to accelerated tread wear is shear stresses propagating through the elastomeric tread material. Elastomeric materials of the type used for caster wheel treads tend to be strong and durable under compression, but substantially more fragile in shear. Working life is also diminished by excessive heat build-up in the tread. Heat is generated while the caster wheel is rolling and the tread is being deformed. Tread thickness has an effect on heat dissipation; thicker treads tend to dissipate heat more slowly into the hub (a heat sink), and thus accelerate wear.

There is a need for a caster wheel that behaves like a thin/hard tread wheel, but has the good characteristics of a thick/soft tread. More still, such a wheel should be readily adaptable to multi-wheel applications that permit a heavy load to be transported on a soft and thin tread material. And even more specifically, there is a need for an optimized tread design with improved load carry capabilities with the ability to better distribute load stresses so as to remove or at least reduce shear effects. Still further, there is a need for a tread design that facilitates heat removal into the hub.

BRIEF SUMMARY OF THE INVENTION

According to a first aspect of this invention, a caster wheel assembly is provided comprising a hub that has a generally annular body centered about a central axis. The hub has an outer peripheral rim section and an inner bearing section. The rim section includes an annular outer rim surface with an annularly dished concave region disposed between a pair of cylindrical lips. A tread surrounds the rim surface. The tread has a convex inner periphery conforming to the annularly dished concave region of the rim surface in a tight nested relationship. The tread also includes a cylindrical pad on each side of the convex inner periphery. The cylindrical pads are disposed in direct opposing relation to the cylindrical lips of the rim surface. The annularly dished concave region of the outer rim surface has a parabolic OD cross-section as taken through a plane extending radially from the central axis.

The parabolic OD cross-section of the outer rim surface facilitates an improved distribution of load-induced stresses within the tread toward compression mode. In other words, the parabolic OD cross-section of the outer rim surface helps re-orient load stresses within the tread away from shear mode. This stress re-positioning (from shear toward compression) allows the tread to carry more load and/or enjoy a longer working life than a wheel of prior art design. The resulting stresses are also more uniform throughout the tread thereby reducing the risk of creating adverse stress concentrations which can lead to premature failure of the tread. Furthermore, the parabolic OD cross-section of the outer rim surface improves heat dissipation from the tread into the hub.

According to another aspect of this invention, a multi-wheel caster wheel assembly comprises at least two hubs. Each hub has a generally annular body centered about a common central axis, and each hub has an outer peripheral rim section and an inner bearing section. Each rim section includes an annular outer rim surface having an annularly dished concave region disposed between a pair of cylindrical lips. At least two treads are provided, each one surrounding a respective one of the rim surfaces. Each tread has a convex inner periphery conforming to the annularly dished concave region of the rim surface in a tight nested relationship. Each tread also includes a cylindrical pad on each side of the convex inner periphery. The cylindrical pads are disposed in direct opposing relation to the cylindrical lips of a respective one of the rim surfaces. The annularly dished concave region of each outer rim surface has a parabolic OD cross-section.

The parabolic OD cross-sections of each outer rim surface provide a distinct load carrying advantage. Stresses emanating from the ground contact point will radiate outward more evenly across the entire surface of the tread as compared with prior art (i.e., non-parabolic) designs. The parabolic interface between hub and tread helps re-orient the lines of stress within the elastomeric tread material toward compression thereby increasing the chances that the tread material will endure shear stresses. This arrangement thus optimizes the load carry capabilities of the caster wheel assembly by improving distribution of the load stresses along the entire surface of the tread and reduces adverse shear effects to thereby increase working life and/or load-carrying capacity and also reduces heat build-up in use.

BRIEF DESCRIPTION OF THE SEVERAL VIEWS OF THE DRAWINGS

These and other features and advantages of the present invention will become more readily appreciated when considered in connection with the following detailed description and appended drawings, wherein:

FIGS. 10A-10D are enlarged views showing the point of contact between tread and ground through progressively increasing loads, with the corresponding distribution stresses through the elastomeric tread body remaining substantially in compression mode.

DETAILED DESCRIPTION OF THE INVENTION

Figure 1:
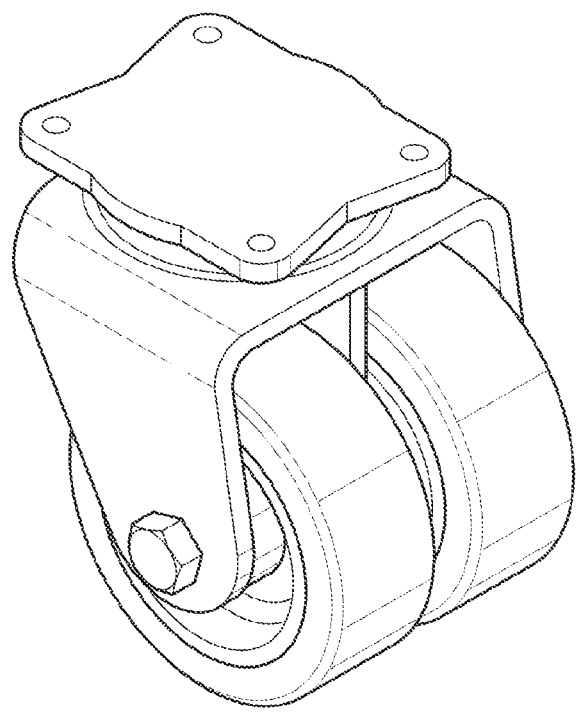
FIG. 1 is perspective view of a prior art dual-wheel swiveling caser assembly.

Referring to FIGS. 2-10D, wherein like numerals indicate like or corresponding parts throughout the several views, a caster wheel assembly is generally shown at 20. The assembly 20 is of the type used in either a multi-wheel assembly or in a single wheel assembly and may be power-driven or un-driven. Likewise, the assembly 20 may be configured as a swiveling type unit, a steerable type unit, or a non-swiveling (fixed) type. For exemplary purposes, the caster wheel assembly 20 is shown in an optional dual-wheel configuration in FIGS. 3 and 7.

The assembly 20 includes a hub, generally indicated at 22. In dual-wheel configurations like that of FIGS. 3 and 7, two generally identical hubs 22 are provided. Three and more-wheel configurations as likewise possible. For convenience, much of the following descriptions will reference the hub 22 in the singular as if in a single-wheel embodiment. However, it should be understood that multi-wheel configurations will include multiple such hubs 22 of identical or nearly identical form. The hub 22 comprises a generally annular body centered about a horizontal central axis A. The central axis A is the rolling axis of the assembly 20. As perhaps best shown in FIGS. 3 and 5, the hub 22 has an outer peripheral rim section 24 and an inner bearing section 26. The bearing section 26 is closest to the central axis A, whereas the rim section 24 is most distal. An annular web section 28 fills the region between the rim section 24 and the bearing section 26. The hub 22 is preferably, but not by necessity, a monolithic structure and may be formed from any of various suitable materials including metal, plastic or composites depending on expected loads and usage. In a preferred embodiment, the hub 22 is made from an aluminum die-cast core for maximum strength. Although the hub 22 is shown as a simple solid structure, the specific design may take many forms including spoke designs, particularly in the web section 28, integrated suspension features, braking features, and the like. In short, the hub 22 shown here is intended to represent any type or design of hub used in any type of caster wheel application.

Figure 3:
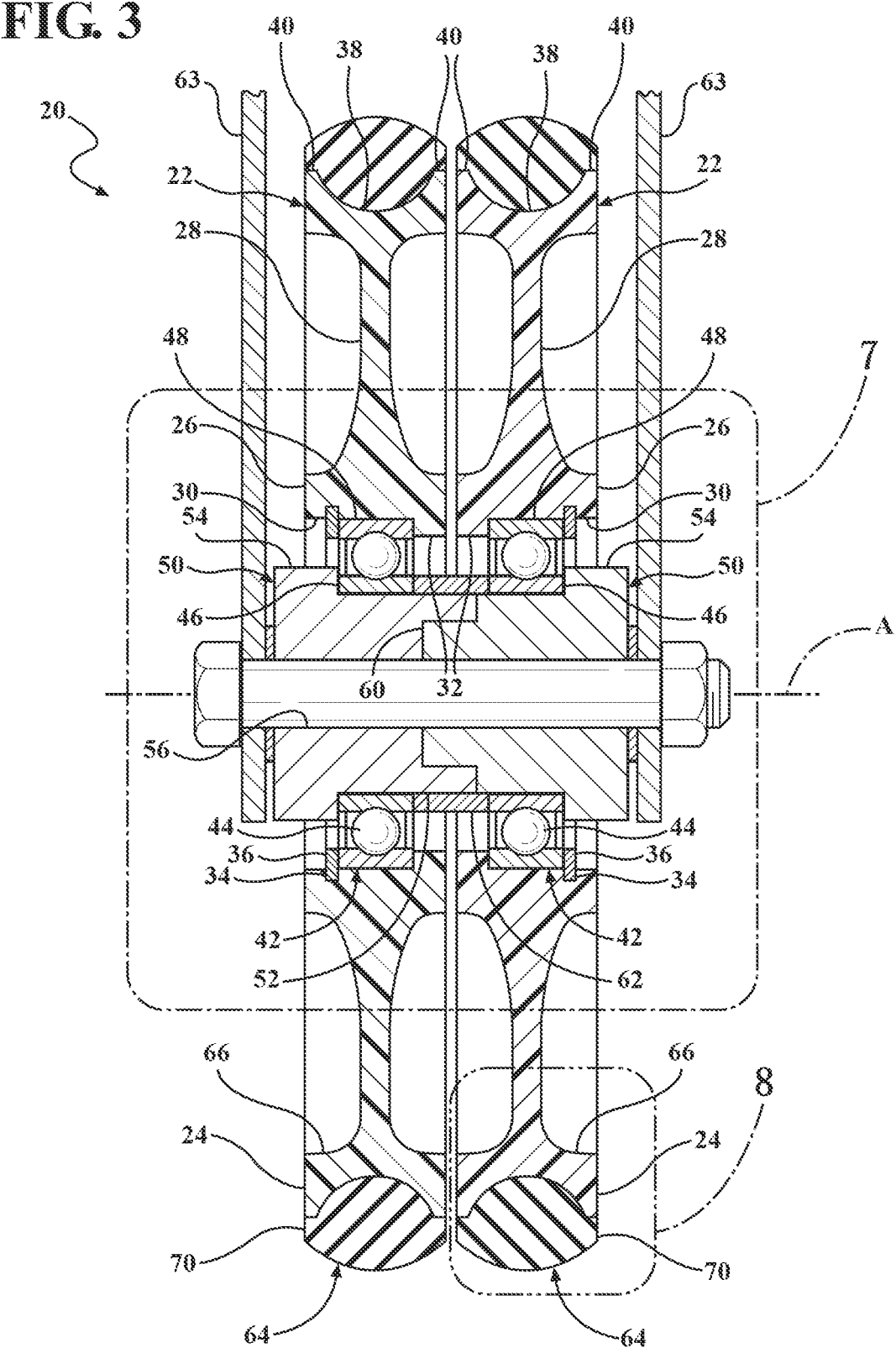
FIG. 3 is a cross-section taken general along lines 3-3 of FIG. 2.
Figure 4:
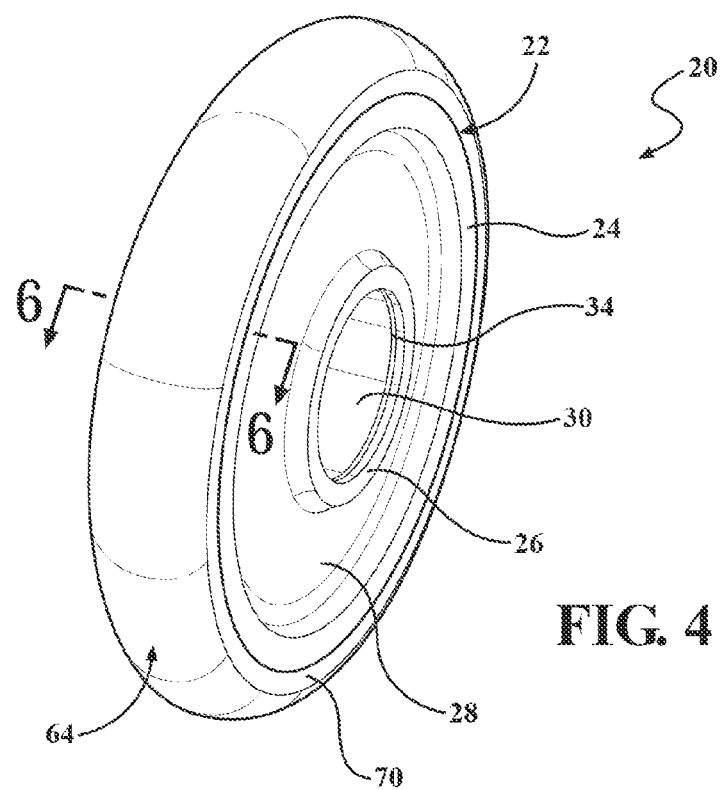
FIG. 4 is a perspective view of the hub and tread.
Figure 5:
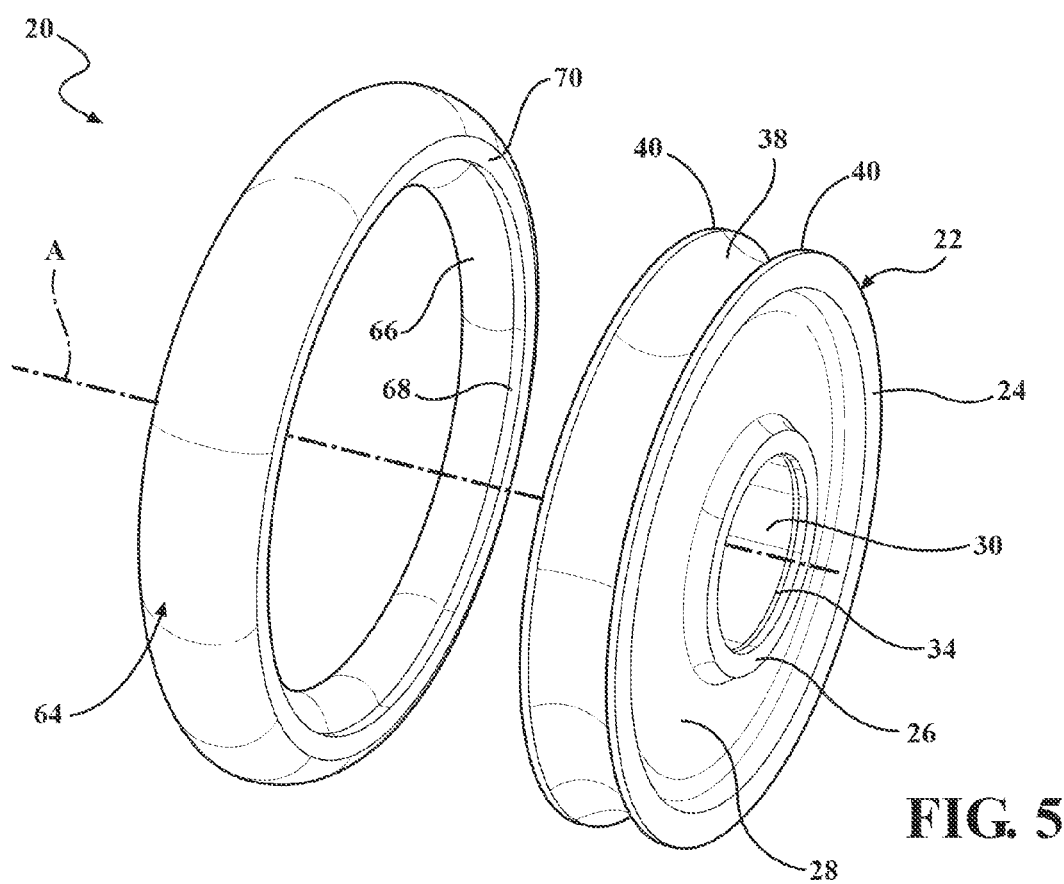
FIG. 5 is an exploded view of the hub and tread as depicted in FIG. 4.
Figure 6:
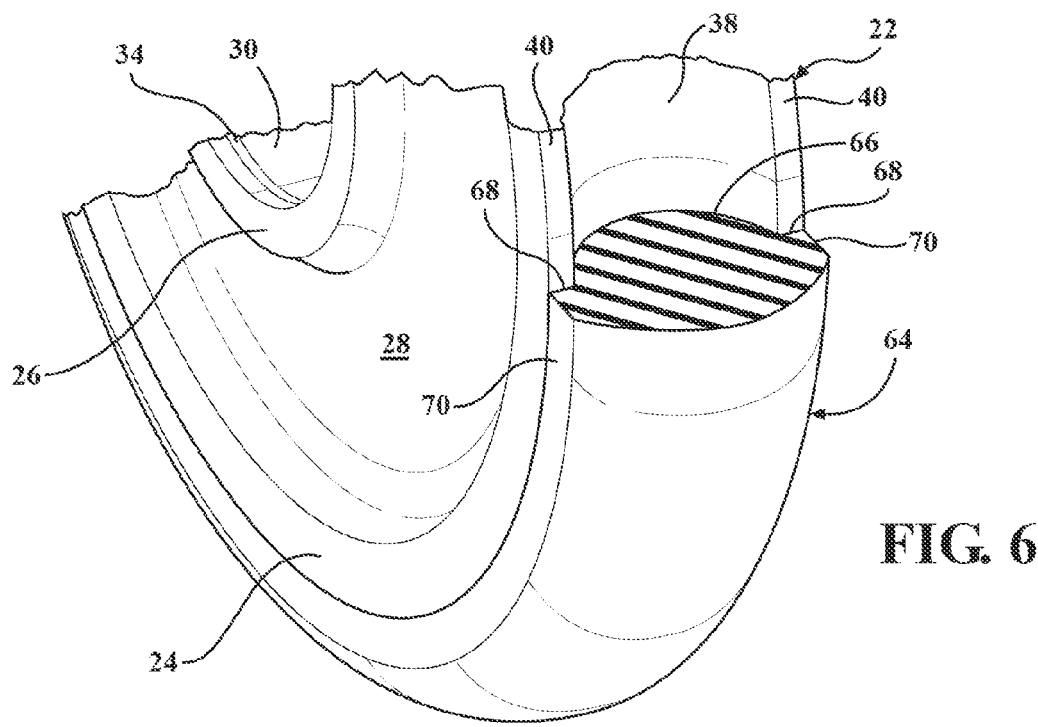
FIG. 6 is a fragmentary view showing the tread in cross-section as taken generally along lines 6-6 of FIG. 4.

In FIG. 3, the hub 22 is shown with its rim section 24 and bearing section 26 having a generally equal axial width. That is, the width of these sections 24, 26 as measured axially, is generally the same. The specific widths of these sections 24, 26 will vary from one application to the next, and it is foreseeable that in some applications the rim section 24 may be narrower or possibly even wider than the width of the bearing section 26. Also evident from FIG. 3, the web section 28 may have an axial width that at most or all points is less than the axial widths of the rim section 24 and the bearing section 26. In the illustrated example, the web section 28 has a relatively narrow axial width that transitions gracefully into each of the rim 24 and bearing 26 sections. As mentioned earlier, the web section 28 can be designed in any number of configurations depending on the application and material used. The web section 28 may also be separately fabricated and subsequently assembled to the rim 24 and bearing 26 sections.

Figure 7:
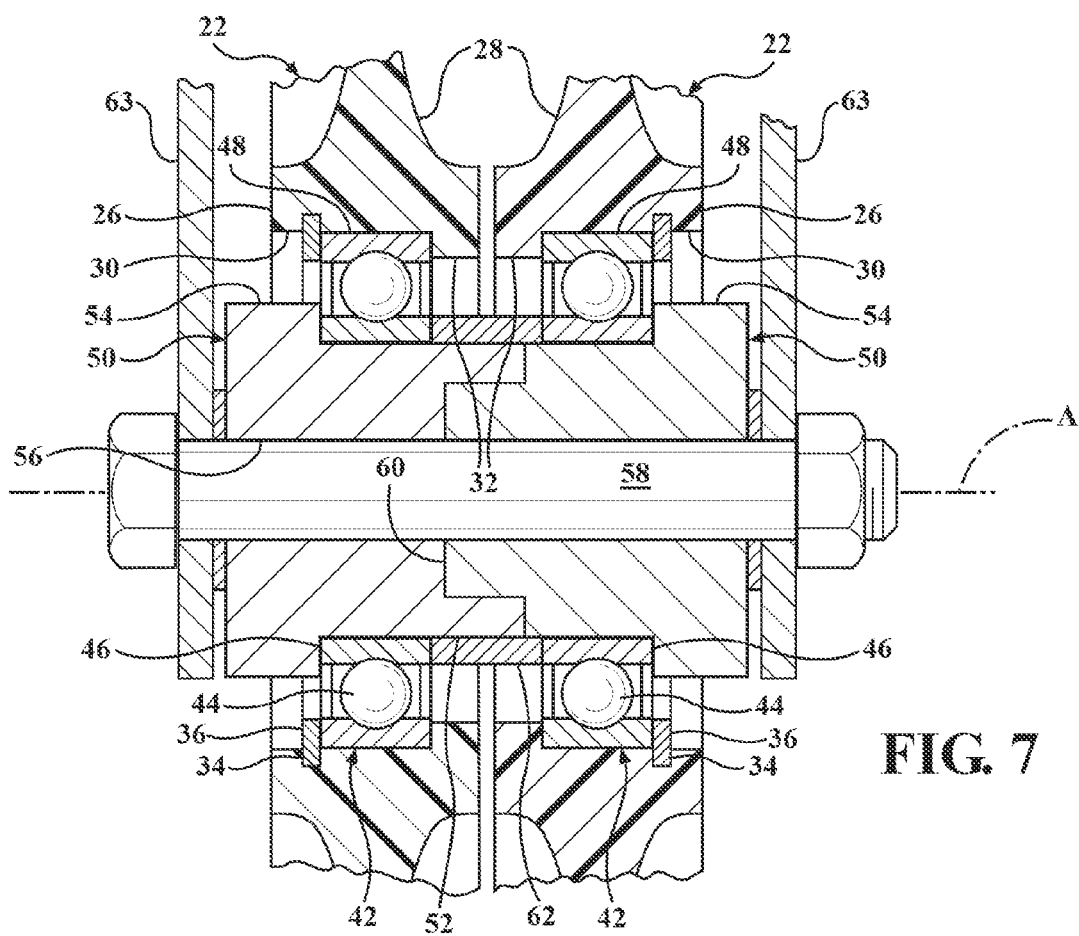
FIG. 7 is an enlarged view of the area indicate at 7 in FIG. 3.
Figure 8:
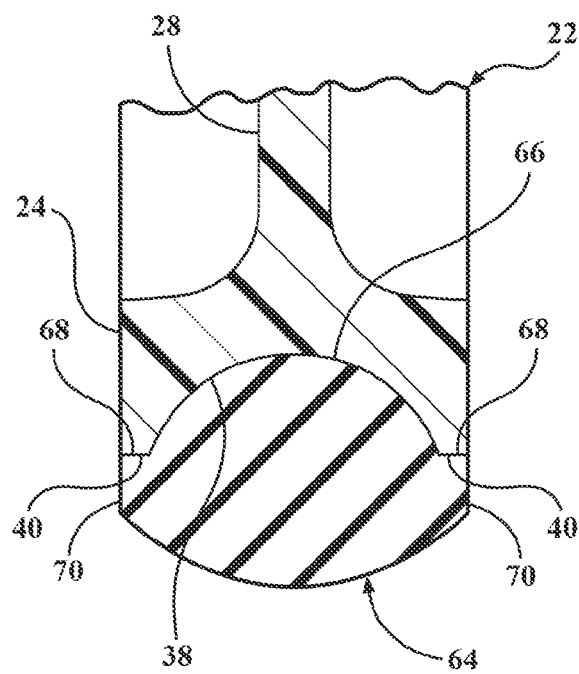
FIG. 8 is an enlarged view of the area indicate at 8 in FIG. 3.

In FIG. 7, the bearing section 26 of the hub 22 is shown including an inner bearing seat defined by a counter-bore 30 and a stop ridge 32. Both the counter-bore 30 and the flange-like stop ridge 32 are centered about the central axis A. In dual-wheel embodiments, it may be advantageous to orient the stop ridge 32 of each hub toward the inside. That is, as depicted in FIGS. 3 and 7, the counter-bores 30 in dual-wheel applications may open toward the outside of each hub 22. A ring groove 34 may be fashioned in the counter-bore 30 to receive a snap ring 36, as will be described below.

Turning now to the rim section 24, reference is made to FIGS. 5, 6, 8 and 9. As shown in these views, the rim section 24 includes an annular outer rim surface which is characterized by an annularly dished concave region 38 disposed between a pair of cylindrical lips 40. That is to say, the outer perimeter of each hub 22 is annularly dished at the concave region 38. The concave region 38 is centrally located, and flanked on each side by a thin flat (i.e., flat when viewed in cross-section) lip 40.

The annularly dished concave region 38 of the outer rim surface has a parabolic OD cross-section as taken through a plane extending radially from the central axis A. The parabolic OD cross-section is perhaps best shown by the broken line in FIG. 9 including an OD focal point B and an OD vertex C. An axis of symmetry D passes radially through the OD focal point B and the OD vertex C, and intersects the central axis A. For purposes of caster wheel applications it has been found that a parabolic shape defined by the equation $y=A*x^2$ will produce a suitable curve for the concave region 38 (as viewed through any cross-section taken radially through the central axis A). In this equation, the letter "A" is a constant which is ideally set within the range of about 1.5-4. More specifically, a parabolic constant "A" of about 3.6 has been found to provide superior results when the concave region 38 has a depth of about 0.5 inches and a width of about 0.75 inches. Even more specifically, a parabolic constant "A" of 3.5556 will proved superb results. Thus, the parabolic curvature in this specific example can be expressed as $y=3.5556*x^2$, or to be less specific $y\approx 3.6*x^2$, or less specific still $y\approx(1.5\leq A\leq 4)*x^2$.

Preferably, but not necessarily, the OD focal point B is generally located between the OD vertex C and the cylindrical lips 40 at any particular radial cross-section. By "generally located" it is meant that the OD focal point B is preferably within this range but could be located further from the OD vertex C in some cases. In the illustrated examples of FIGS. 9 and 10A-10B, the OD focal point B is set relatively close to the OD vertex C. In the specific example above where the parabolic curvature is expressed as $y=3.5556*x^2$, the OD focal point may be approximately 0.07" away from the OD vertex C. Of course, the OD focal point B could be set more distal from OD vertex C than the lips 40, and yet still provide acceptable results. For reasons that will be described in greater detail below, enhanced operating characteristics of the assembly 20 can be realized when the OD focal point B is located in any of a wide range of positions along the axis of symmetry D.

In the disclosed embodiment a bearing, generally indicated at 42, is disposed inside the counter-bore 30 of the hub 22, abutting the stop ridge 32. As perhaps best shown in FIG. 7, the bearing 42 may comprise a roller bearing having a plurality of roller elements 44 trapped between inner 46 and outer 48 races. The annular outer race 48 may be dimensioned for a press-fit or interference fit in the counter-bore 30 to assure that the outer race 48 is seated in and rotates with the hub 22 in use. The bearing 42 is secured in the counter-bore 30 with the snap ring 36. The snap ring 36 is seated under spring tension in the ring groove 34 and bears against the outer race 48 so as to contain the bearing 42 in an operative position in the counter-bore 30 even under the influence of strong side-loading. Although a roller type bearing 42 is preferred for many applications, it should be understood that sliding bearings as well as simple bushings could be used under appropriate circumstances. Each wheel can therefore be fitted with a variety of different bearing types. The bearing type should be a consideration with designing a wheel into a specific application. For example, roller bearings are often selected for manual applications and walking speeds, precision ball bearings are typically selected for higher speed applications that take less abuse or that may need to be sealed for maintenance free applications, and tapered bearings are used for the most abusive applications and heaviest loads.

An axle system interacts with the bearing 42 along the central axis A. The axle system includes a bushing, generally indicated at 50, which has a cylindrical outer surface 52 disposed inside the circular opening of the inner race 46. The annular opening inside the inner race 46 may be dimensioned for a press-fit or at least relatively tight fit over the bushing 50 so that the inner race 46 and rotates with the bushing 50 in use. The bushing 50 may include a flange 54 configured to abut an axial face of the bearing inner race 46. In the illustrated examples, the bushing 50 is provided with a central through-hole 56 extending along the central axis A. An axle shaft 58 is disposed in the through-hole 56. In contemplated alternative embodiments, the bushing 50 may be formed with integrated pintles or journals that obviate the need for a separate axle shaft 58. Many other options exist.

In dual-wheel embodiments, the bushing 50 may comprise interlocking half-sections, with each half-section associated with a different one of the bearings 42 and holding both in axial alignment. As shown in FIGS. 3 and 7, the interlocking half-sections of the bushing 50 may mate together at a male-female interface 60. Naturally three-wheel (and more) embodiments are possible by simple duplication of features. In multi-wheel applications, the bearings 42 may be separated from one another by an annular spacer 62. The spacer 62 is shown best in FIG. 7. The inner diameter of the spacer 62 is preferably equal to the inner diameters of the bearings 42 so that they are all centrally supported on the one common bushing 50. That is to say, in multi-wheel applications a spacer 62 is located each two adjacent bearings 42 to maintain a preferred separation between the stacked wheel assemblies. The outer flanges 54 of the bushing 50 butt against the inner races 46 of the two outside bearings 42 to sandwich all of the inner bearing races 46 and spacer(s) 62 into a generally unified, connected, compressed structure. An axle shaft 58 slides through a common through-hole 56 in the bushing 50 to support the multiple hubs 22 for independent rotation.

Figure 2:
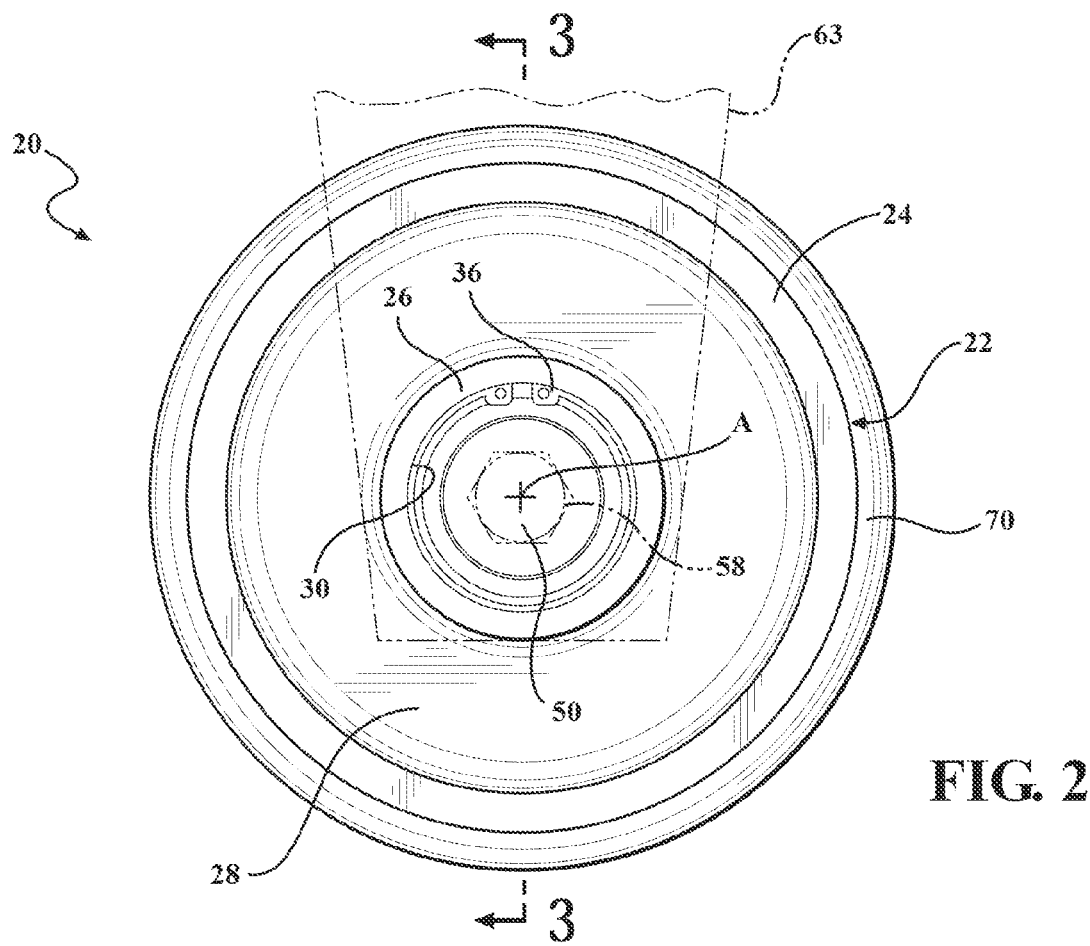
FIG. 2 is front view of a caster wheel assembly according to one embodiment of the present invention, with a portion of the supporting bracket shown in phantom.

As shown in FIGS. 2 and 3, a support bracket 63 interacts with the axle shaft 60 to attach the assembly 20 to a cart or other vehicle in use. The support bracket 63 is shown in this illustrative example including a pair of legs positioned on either side of the hub 22. Each leg includes an axle hole aligned with the bushing through-hole 56 to receive the axle shaft 60 and thus support the hub 22. The support bracket 63 may of course take many forms within the spirit of this invention, and may include swiveling, braking and other common features as needed.

A tread, generally indicated at 64, surrounds the outer rim surface of the rim section 24. The tread 64 is preferably fabricated from a resilient elastomeric material, such as polyurethane or other suitable rubber or rubber-like compounds. Of course, the tread 64 may be formed from a variety of other resilient materials. In practice, the tread 64 can be overmolded onto the hub 22, or loose-piece molded and subsequently assembled to the hub 22 (as alluded to in the exploded view of FIG. 5). The tread 64 seats in a snug nested relationship within the various contours of the outer rim surface of the hub 22. In particular, the tread 64 is shown having a convex inner periphery 66 conforming to the annularly dished concave region 38 of the rim surface in a mated relationship. The tread 64 also includes a cylindrical pad 66 on each side of the convex inner periphery 66. That is to say, a pair of cylindrically-shaped pads 68 are formed on each side of the convex inner periphery 66 and in direct opposing relation to the cylindrical lips 40 of the rim surface. The tread 64 has an outermost rolling surface that is convexly rounded and bounded on either side by flat sidewalls 70. The width of the sidewalls 70 is preferably equal or generally equal to the width of the rim section 24.

Figure 9:
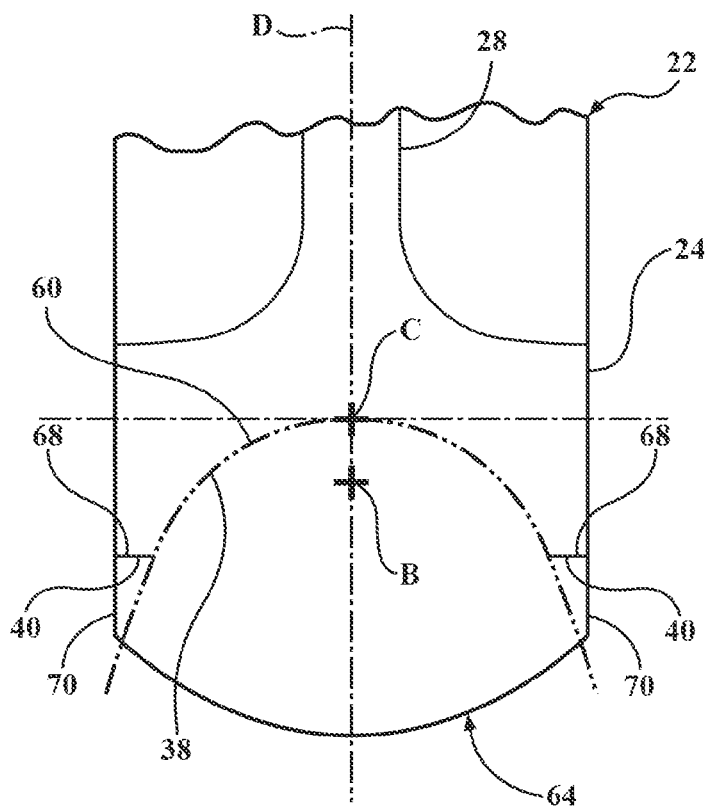
FIG. 9 is a view as in FIG. 8 but showing the focal and vertex points of the parabolic interface between hub and tread.

Referring again to FIGS. 8 and 9, the convex inner periphery 66 of the tread 64 also has a parabolic ID cross-section as taken through a plane extending radially from the central axis A, like its mirrored concave region 38. That is, the tread 64 completely fills the rim outer periphery so that there are no voids or pockets of air therebetween. Preferably, the extrapolated pattern of the parabola at any given cross-section intersects the exposed surface of the tread 64 at or near the point of transition between the flat sidewalls 70 and the convex rolling surface of the tread 64. As shown in FIG. 9, in one exemplary embodiment the extrapolated pattern of the parabola intersects the convex rolling surface of the tread 64 at or just inside the sidewall 70 transition points.

The parabolic ID cross-section has an ID focal point that coincides with the OD focal point B. The ID focal point, like the OD focal point B, can therefore be located in any of a wide range of positions along the axis of symmetry D. In the specific example above where the parabolic curvature is expressed as $y=3.5556*x^2$, the ID focal point may be located approximately 0.07" away from the OD vertex C to provide suitable performance. This and other positions of the ID focal point are considered within acceptable operating parameters.

An ID vertex coincides with the OD vertex C, and the axis of symmetry D is shared by the convex inner periphery 66 of the tread 64 and the concave region 38 of the rim section 24. As mentioned several times, the precise location of the parabolic focal point is intended to be generously defined and to include locations of the ID focal point both less as well as more distal from the ID vertex. In terms of a range, the coincident ID/OD focal points B may be located almost anywhere within the body of the tread 64. That is, the ID/OD focal points B should lie along the axis of symmetry D somewhere between the convex crest of the tread's rolling surface and the OD vertex C. Various advantages can be derived by strategically locating the parabolic focal points not only in the above-describe example but also so as to lie somewhere between the OD vertex C and the axial alignment of the lips 40/pads 68.

Referring now to FIGS. 10A through 10D, the tread 64 is shown responding to progressively increasing loads. Under light loads (FIG. 10A), the ground contact patch (i.e., footprint) of the assembly 20 is relatively small and transmits forces through the thickest portion of the tread 64 in a conically spreading manner into the concave region 38. The effect is substantial tread 64 resiliency and shock absorption, as the meatiest part of the tread 64 is taking substantially all of the stresses generated by the weight forces. As progressively greater loads are carried through the assembly 20, the reaction forces spread progressively outwardly, somewhat truncating the conical stress distribution. For example, FIG. 10B represents somewhat greater loading as compared with the respective preceding illustrations of FIG. 10A. With greater loading, the ground contact patch widens, thus transmitting forces and stresses through a widening portion of the tread 64 but still centered about the axis of symmetry D. FIG. 10C represents still greater loading as compared with the respective preceding illustrations of FIG. 10B. As shown, the ground contact patch widens still further, transmitting forces and stresses through an even wider portion of the tread 64. FIG. 10D depicts yet still higher loading conditions in which all or substantially the entire convexly rounded outermost portion of the tread 64 has been flattened under load. At this loading level and above, a significant portion of the force distribution is finally transmitted through the lips 40.

As can be appreciated by one of skill in the art, under light loading the assembly 20 will behave like a traditional thick tread caster wheel with good shock absorption, but under very heavy load the assembly 20 will behave like a prior art thin tread design that is easy to roll. The unique interface between hub 22 and tread 64 enables the present caster assembly 20 to behave like a traditional thin tread wheel under heavy loads, while retaining also the traditional good characteristics of a thick tread when the loading is light. The assembly 20 is readily adaptable to multi-wheel applications that permit heavy loads to be transported on a soft and thin tread material. The assembly 20 will thus have a very long tread life and offer substantially maintenance free service.

The particular benefits of the parabolic tread inner periphery 66/rim section 24 interface will be described in further detail. Most materials are stronger under compression than under a shear or tensile load. Elastomers, from which the tread 64 is composed, are materials that can be expected to behave optimally in compression. The convex shape of the outer rim section 24, paired with complimentary inner periphery 66 of the tread 64, causes the predominant resulting load-induced stresses within the tread 64 to orient in compression. By manipulating the shape of the propagating stress through the back-stopping parabolic interface, the assembly 20 of this invention is able to carry more load than a comparable prior art wheel without a parabolic interface and/or to carry high loads with less heat build-up. The novel parabolic interface of this invention causes the load-induced stresses to be more uniform throughout the tread 64 thereby reducing the risk of creating localized stress concentrations leading to failure of the tread 22. Furthermore, heat is generated by the tread 64 when deformed under load and concurrently rolled. Greater loading and/or rolling speed causes more (or more frequent) deformation, which in turn causes greater heat build-up in use. The parabolic interface enables the tread 64 to achieve the favorable characteristics of a thick tread (e.g., shock absorption) but without the problematic heat build-up issues of a prior art thick tread wheel by managing the shape of the load-induced stresses within the tread 64. In particular, the parabolic interface reduces the shear effects that contribute to heat build-up, and also enables heat that does inevitably build-up within the body of the tread 64 (due to rolling deformation) to be more directly removed into the hub 22.

As depicted in FIGS. 10A-10D, the parabolic tread inner periphery 66/rim section 24 interface provides distinct load carrying advantages as compared with non-parabolic designs of the prior art. Stresses originating at the ground contact point will radiate evenly across the entire body of the tread 64. Ground contact can be assumed to occur along a relatively flat surface, i.e., the ground. While it may be appreciated by those of skill in the art that load-induced stresses do not reflect from a parabolic surface as sound or light rays would, FIGS. 10A-10D are nevertheless instructive to illustrate how stress lines emanating from a flat ground contact patch will encounter a parabolic interface and orient more or less in compression to make effective use of the resilient tread material with minimal shear stresses. A point load applied to the outer tread surface will produce stress in a conically propagating shape from the force in the material being deformed. As a result, the stress in the tread 64 emanating from the flat ground contact patch will spread through the body of elastomeric material. The goal of the convex shape formed at the tread inner periphery 66/rim section 24 interface of this invention is to resist most or all of the conically propagating stress on the concave inner region 38 of the rim 24 against an opposing surface that will maintain the stress within the body of the tread 64 under compression or as close to compression as possible. A parabolic interface has been found to provide an ideal configuration for maintaining the load-induced stresses within the elastomeric tread 64 under compression, when it is considered that the opposing ground contact patch is generally flat/planar. That is, the parabolic interface has been found to be the ideal configuration as a surface shape in opposition to the flat ground patch where load-induced stresses are formed therebetween, so that shear stresses are minimized while compressive stresses are maximized.

When an elastomer material is deformed, it behaves somewhat analogous to an incompressible fluid and tends to bulge out on the sides. In a caster wheel application, where the tread is made from an elastomer, that deformation-induced overhang creates a shear zone within the elastomer that as a result creates a material weak point. The novel parabolic interface minimizes formation of the bulge negative effects so that the tread elastomer is placed predominantly throughout in compression. A parabolic interface is advantageous over a rectangular or square interface profile because the unique qualities of a parabola provide a far more gradual transition in the stress propagations from a flat ground patch. On the other hand, a parabolic interface is advantageous over a circular interface profile because, in a tread having comparable tread thickness, the sides of a corresponding circle shape would too rapidly turn vertical which would not adequately support the load in compression. By suitable thickness, it will be understood that applications will differ and dictate different proportions of tread/hub dimensions. Generally stated, however, for a tread that is too shallow, the elastomer stress cone produced under average loading is likely to go beyond the concave interface boundary and thus create areas of undesirable shear along the lateral regions of the tread. Accordingly, for caster wheel applications, the parabola can yield a far more gradually transitioning curve than any other geometric shape for the tread inner periphery 66/rim section 24 interface.

The unique tread 64 configuration of this invention optimizes the load carry capabilities of the assembly 20 by optimally distributing the load along the entire surface of the tread 64 and reducing adverse shear effects. This configuration also minimizes heat build-up, provides improved impact resistance, and maximizes the service life of the assembly 20. The design is particularly conducive to multi-wheel embodiments which further benefit from reduced friction without scrubbing or sliding when turning. The assembly 20 is readily adaptable to a wide variety of industrial applications, and provides easier movement of loaded carts or vehicles. Caster wheel assemblies 20 incorporating elements of this invention are excellent for production racks (power transported, manually handled and mobile fixtures), parts bins, conveyor systems, and other applications where maintenance free casters and ergonomics are desired.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A multi-wheel caster wheel assembly comprising:
at least two hubs, each said hub comprising a generally annular body centered about a common central axis, each said hub having an outer peripheral rim section and an inner bearing section, each said rim section including an annular outer rim surface having an annularly dished concave region disposed between a pair of cylindrical lips,
at least two treads, each said tread surrounding a respective one of said rim surfaces, each said tread having a convex inner periphery conforming to said annularly dished concave region of said rim surface in a tight nested relationship, each said tread including a cylindrical pad on each side of said convex inner periphery, said cylindrical pads disposed in direct surface-to-surface contact with said cylindrical lips of a respective one of said rim surfaces,
wherein said annularly dished concave region of each said outer rim surface has a parabolic OD cross-section,
wherein said parabolic OD cross-section is defined by the equation y=A*x2, where A is between 1.5 and 4, and
further including a bearing disposed inside said inner bearing section of each said hub, and a bushing having a cylindrical outer surface disposed inside each said bearing.

2. The assembly of claim 1 wherein said parabolic OD cross-section is defined by the equation $y=A*x^2$, where A is about 3.6.

3. The assembly of claim 1 wherein each said tread is fabricated from a resilient elastomeric material.

4. The assembly of claim 3 wherein each said tread includes an outermost rolling surface, said outermost rolling surface being convexly rounded.

5. The assembly of claim 1 further including an annular spacer disposed between each of said bearings and about said cylindrical outer surface of said bushing.

6. The assembly of claim 5 wherein said bushing comprises a split bushing having interlocking male and female top hat sections, said male top hat section operatively associated with one of said bearings and said female top hat section operatively associated with the other of said bearings.

7. A caster wheel assembly comprising:
a hub comprising a generally annular body centered about a central axis, said hub having an outer peripheral rim section and an inner bearing section, said rim section including an annular outer rim surface having an annularly dished concave region disposed between a pair of cylindrical lips, a tread surrounding said rim surface, said tread having a convex inner periphery conforming to said annularly dished concave region of said rim surface in a tight nested relationship, said tread including a cylindrical pad on each side of said convex inner periphery, said cylindrical pads disposed in direct surface-to-surface contact with said cylindrical lips of said rim surface, wherein said annularly dished concave region of said outer rim surface has a parabolic OD cross-section, wherein said parabolic OD cross-section is defined by the equation $y=A*x^2$, where A is between 1.5 and 4, and wherein said bearing section includes an inner bearing seat defined by a counter-bore.

8. The assembly of claim 7 wherein said parabolic OD cross-section is defined by the equation $y=A*x^2$, where A is about 3.6.

9. The assembly of claim 7 wherein said tread is fabricated from a resilient elastomeric material.

10. The assembly of claim 9 wherein said tread includes an outermost rolling surface, said outermost rolling surface being convexly rounded.

11. The assembly of claim 7 wherein said rim section and said bearing section have generally equal axial widths.

12. The assembly of claim 11 wherein said hub further includes an annular web section disposed between said rim section and said bearing section, said web section having an axial width less than the axial widths of said rim section and said bearing section.

13. The assembly of claim 7 further including a bearing disposed inside said counter-bore of said hub.

14. The assembly of claim 13 wherein said bearing comprises a roller bearing having a plurality of roller elements trapped between inner and outer races.

15. The assembly of claim 13 further including a bushing having a cylindrical outer surface disposed inside said bearing, said bushing having a central through-hole extending along said central axis, an axle shaft disposed in said through hole.

* * * * *